Sept. 23, 1969     T. P. VOGL ET AL     3,468,594
OPTICAL APPARATUS FOR USE IN INFRARED RADIATION
Filed June 6, 1968
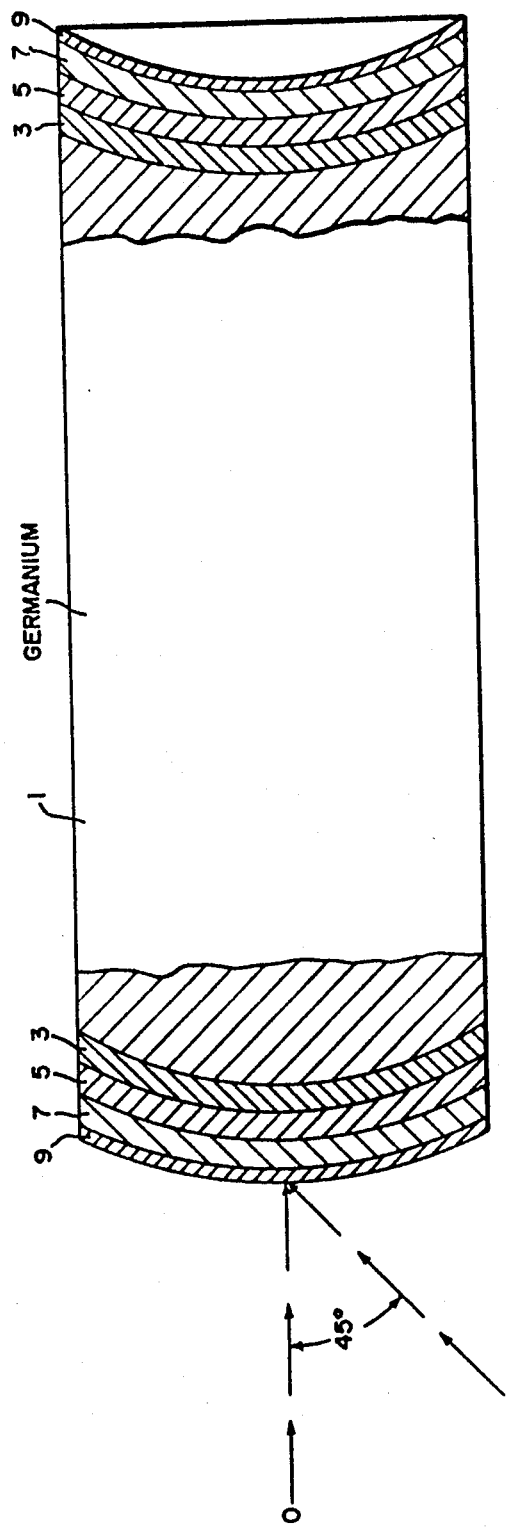

3,468,594
Patented Sept. 23, 1969

3,468,594
OPTICAL APPARATUS FOR USE IN INFRARED RADIATION
Thomas P. Vogl, Pittsburgh, Pa., and Richard J. Pegis, Hilton, N.Y., assignors to Westinghouse Electric Corporation, Pittsburgh, Pa., a corporation of Pennsylvania
Continuation-in-part of application Ser. No. 396,296, Sept. 14, 1964. This application June 6, 1968, Ser. No. 734,942
Int. Cl. G02b *5/20, 13/14, 3/00*
U.S. Cl. 350—1                                       4 Claims

ABSTRACT OF THE DISCLOSURE

This invention relates to anti-reflective coatings for germanium and silicon lenses. More specifically, the invention is directed to a germanium or silicon lens in the 8 to 13 micron infrared region having a coating of zinc sulfide of a thickness of 1.120 microns and a barium fluoride coating of a thickness of 1.320 microns.

Cross reference to related applications

This application is a continuation-in-part of application Ser. No. 396,296, filed Sept. 14, 1964, now abandoned.

Background of the invention

This invention relates to optics and has particular relationship to optical apparatus and optical systems for use with infrared radiation.

A typical optical system for infrared radiation is disclosed in application, Ser. No. 366,554, filed May 11, 1964 to Thomas P. Vogl, now Patent No. 3,363,962 and assigned to Westinghouse Electric Corporation. This apparatus has been found to be highly effective in the transmission and focusing of infrared radiation in the range of wavelengths between 8 and 13 microns. Such apparatus and other related apparatus useful for infrared radiation includes germanium lenses.

In using optical apparatus and systems with germanium lenses, it has been found that there is considerable loss of radiation incident on any surface by reason of the large proportion of the incident radiation which is reflected. The coefficient of reflection is given by the formula $$R = \left(\frac{n-1}{n+1}\right)^2$$

in which R is the reflection coefficient and $n$ is the index of refraction. R may be expressed in percent of the incident radiation. This coefficient R in the case of germanium results in substantial loss of incident radiation at all surfaces because for germanium the index, $n$, is the order of 4. With $n$ equal to 4 in the above equation, R becomes .36. In the case of germanium lenses, 36% of the incident radiation is lost by reflection from each of the surfaces on which the radiation is incident.

It is accordingly an object of this invention to overcome the above-described difficulty and to provide optical apparatus with germanium lens components in which the reflection of incident radiation from the optical surfaces of the germanium shall be minimized.

Summary of the invention

In accordance with this invention, the reflection from each optical surface of the germanium lenses is minimized by coating the surface with an inner layer composed of silicon, an intermediate layer composed of zinc sulfide and an outermost layer composed of barium fluoride. The coating is preferably effected in a vacuum by deposition on the coated surface of vapor of the coating material. The silicon and barium fluoride may be derived from evaporation from a bath of the material or by electron beam bombardment of a mass of the material; the zinc sulfide is derived by electron-beam bombardment of a mass of the sulfide. The thickness of each layer is approximately an optical one-quarter wavelength of the center wavelength of the radiation over the range of wavelengths of the radiation which the lens is to transmit and focus. Specifically, this thickness is equal to approximately one-quarter wavelength at the center wavelength of the range divided by the refractive index of the material being deposited. The barium fluoride surface may be protected by a thin layer of silicon monoxide of about 100 angstroms thick. The thickness of the layers may be determined by optical interference fringe measurements. The layers are transparent to the radiation of wavelengths of between 8 and 13 microns which the optical system is to transmit and do not materially attenuate this radiation.

The performance of the reflection-suppressing coatings was evaluated in the range of infrared radiation between 8 and 13 microns at angles of incidence from 0 to 45 degrees. Over this range of angles of incidence, the reflection coefficient R, varies from .8% to 2% depending on the wavelength of the transmitted radiation, the angle of incidence and the polarization of the radiation. The average reflection coefficient was approximately 1% on each surface; this 1% compares with the 36% per surface which is the coefficient for an uncoated germanium optical surface.

Certain novel features considered characteristic of this invention are disclosed generally above. For a better understanding of this invention, both as to its organization and as to its method of operation, together with additional objects and advantages thereof, reference is made to the following description taken in connection with the accompanying drawing, in which the single figure is a view in section showing a lens in accordance with this invention.

Brief description of the drawing

The single figure is a drawing of a lens of germanium including anti-reflective coatings.

Description of preferred embodiments

The lens shown in the drawing includes an optical element 1 composed of germanium. This element is coated on both optical surfaces with an inner layer 3 of silicon of a thickness of 0.7062 micron, an intermediate layer 5 of zinc sulphide of a thickness of 1.120 and an outer layer 7 composed of barium fluoride of a thickness of 1.320 microns. The outer layer may be coated by a protective layer 9 of silicon monoxide. The evaluation of this lens resulted in the measurement of a reflection loss of between .8% to 2% over a range of incidence angles from 0 to 45° as shown in the drawing. The reflection loss was to less than 2% up to angles of incidence up to 45°. In case of a single coating of zinc sulfide on the germanium the reflection loss was from .8% to 12%.

This invention has produced highly satisfactory results in connection with optical apparatus including germanium lenses coated as taught. The invention then as applied to germanium lenses has peculiar important advantages.

In its broader aspects, this invention is also applicable to optical apparatus which includes optical components of silicon. In this case, the optical surfaces are provided with only two coatings and a protective layer; the lens itself is composed of silicon, and the silicon coating used for germanium lenses may be dispensed with. Within the broader aspects of this invention, then is the lens composed of silicon having a thin inner coating of zinc sulfide of a thickness of 1.120 microns and an outer coating of barium fluoride of a thickness of 1.320 microns. As in the case of the germanium lenses, the thickness of each coating is approximately one-quarter wavelength at the center frequency of the radiation to be transmitted and focused divided by the refractive index.

While preferred embodiments of this invention have been disclosed herein, many modifications thereof are feasible. This invention then is not to be restricted except insofar as it is necessitated by the spirit of the prior art.

We claim as our invention:

1. The optical apparatus of claim 3 for transmission within the range of 8 to 13 microns wherein the thickness of said inner layer is about .7062 micron, said intermediate layer of a thickness of about 1.120 microns and said outer layer of a thickness of about 1.320 microns.

2. The optical apparatus of claim 4 for transmission in the 8 to 13 microns wavelength region wherein the thickness of said inner layer is about 1.120 microns and said outer layer is about 1.320 microns.

3. Optical apparatus having at least one optical element of germanium, at least one surface of said element having a coating comprising an inner layer of silicon, an intermediate layer of zinc sulfide and an outer layer of barium fluoride for transmission of a predetermined range of wavelengths in the infrared spectral region wherein the thickness of each layer is approximately equal to one-quarter the wavelength of the radiation at the center wavelength of said range divided by the refractive index of the material deposited at said center wavelength.

4. Optical apparatus having at least one optical element of silicon, at least one surface of said element having a coating comprising an inner layer of zinc sulfide and an outer layer of barium fluoride for transmission of a predetermined range of wavelengths in the infrared spectral region wherein the thickness of each layer is approximately equal to one-quarter the wavelength of the radiation at the center wavelength of said range divided by the refractive index of the material deposited at said center wavelength.

References Cited

UNITED STATES PATENTS 2,660,925 12/1953 Turner.
2,758,510 8/1956 Auwarter.

OTHER REFERENCES

Cox et al.: "Infrared Filters of Antireflected Si, Ge, InAs, and InSb," J. Opti. Soc. Am., vol. 51, No. 7, Jan. 9, 1961, pp. 714–718, QC 350 06.

Cox et al.: "Antireflection Coatings for Germanium and Silicon in the Infrared," J. Opt. Soc. Am., vol. 148, No. 10, October 1958, pp. 677–680, QC 350 06.

Steudel: "Journal de Physique et le Radium," vol. 19, No. 3, March 1958, pp. 312–318, QC 1 J8.

DAVID SCHONBERG, Primary Examiner

MICHAEL J. TOKAR, Assistant Examiner

U.S. Cl. X.R.

350—2